(12) United States Patent
Chen et al.

(10) Patent No.: US 8,868,126 B2
(45) Date of Patent: Oct. 21, 2014

(54) MOBILE APPARATUS WITH RADIO FREQUENCY ARCHITECTURE SUPPORTING SIMULTANEOUS DATA AND VOICE COMMUNICATIONS

(75) Inventors: Wei-Chien Chen, Taoyuan (TW); Wei-Yang Wu, Taoyuan (TW); Yen-Chuan Lin, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 245 days.

(21) Appl. No.: 13/490,921

(22) Filed: Jun. 7, 2012

(65) Prior Publication Data

US 2013/0005392 A1      Jan. 3, 2013

Related U.S. Application Data

(60) Provisional application No. 61/502,872, filed on Jun. 30, 2011.

(51) Int. Cl.
*H04W 88/00* (2009.01)
(52) U.S. Cl.
USPC .......... 455/550.1; 455/552.1; 455/553.1; 455/103; 455/132
(58) Field of Classification Search
USPC .......... 455/550.1, 552.1, 553.1, 103, 132
See application file for complete search history.

(56) References Cited

U.S. PATENT DOCUMENTS

| | | | | |
|---|---|---|---|---|
| 6,385,262 | B1 * | 5/2002 | Gustafsson et al. | 375/350 |
| 7,917,170 | B2 * | 3/2011 | Zhitnitsky | 455/552.1 |
| 2005/0037800 | A1 * | 2/2005 | Shih | 455/550.1 |

FOREIGN PATENT DOCUMENTS

CN        101911520 A       12/2010

\* cited by examiner

*Primary Examiner* — Michael T Vu
(74) *Attorney, Agent, or Firm* — Rabin & Berdo, P.C.

(57) ABSTRACT

Mobile apparatus with radio frequency architecture supporting simultaneous data and voice communications, in an embodiment, includes first and second antennas, a tranceiver unit, first and second radio frequency (RF) front-end units. The tranceiver unit has a plurality of first, second, and third RF terminals. The first RF front-end unit is coupled between the first antenna and first RF terminals to provide first paths for a high-speed data communication mode and a first mobile communication mode between the first RF terminals and first RF front-end unit. The second RF front-end unit is coupled between the second antenna and second and third RF terminals to provide second paths for at least one second communication mode between the second RF terminals and second RF front-end unit and to provide third paths for the high-speed data communication mode and first mobile communication mode between the third RF terminals and second RF front-end unit.

17 Claims, 3 Drawing Sheets

MOBILE APPARATUS WITH RADIO FREQUENCY ARCHITECTURE SUPPORTING SIMULTANEOUS DATA AND VOICE COMMUNICATIONS

This application claims the benefit of provisional application Ser. No. 61/502,872, filed Jun. 30, 2011, the disclosure of which is incorporated by reference herein in its entirety.

BACKGROUND

1. Technical Field

The disclosure relates in general to a mobile device with radio frequency architecture, and more particularly to a mobile device with radio frequency architecture supporting simultaneous data and voice communications.

2. Description of the Related Art

Mobile phone systems are evolved from the second generation to the third generation, further to the Long Term Evolution (LTE) system. In the course of evolution, much more ranges of the radio frequency spectrum are adopted and the mobile phones are required to support more frequency bands. This implies that (1) a mobile phone needs to equip with more antennas or (2) the antenna of a mobile phone needs to cover more frequency ranges. One of these situations would lead to the increase of the volume and inconvenient for the user.

SUMMARY

The disclosure is directed to a mobile apparatus with radio frequency architecture supporting simultaneous data and voice communications.

According to one embodiment, a mobile apparatus with radio frequency circuit architecture supporting simultaneous data and voice communications. The mobile apparatus includes a first antenna and a second antenna, a tranceiver unit, a first radio frequency (RF) front-end unit and a second RF front-end unit. The first antenna is disposed between a first portion of the mobile apparatus. The second antenna is disposed between a second portion of the mobile apparatus. The tranceiver unit has a plurality of first radio frequency terminals, a plurality of second radio frequency terminals, and a plurality of third radio frequency terminals. The first radio frequency frond-end unit is coupled between the first antenna and the first radio frequency terminals so as to provide a plurality of first paths for a high-speed data communication mode and a first mobile communication mode between the first radio frequency terminals and the first radio frequency front-end unit. The second radio frequency front-end unit is coupled between the second antenna and the second and third radio frequency terminals so as to provide a plurality of second paths for at least one second mobile communication mode between the second radio frequency terminals and the second radio frequency front-end unit and to provide a plurality of third paths for the high-speed data communication mode and the first mobile communication mode between the third radio frequency terminals and the second radio frequency front-end unit.

Figure 1:
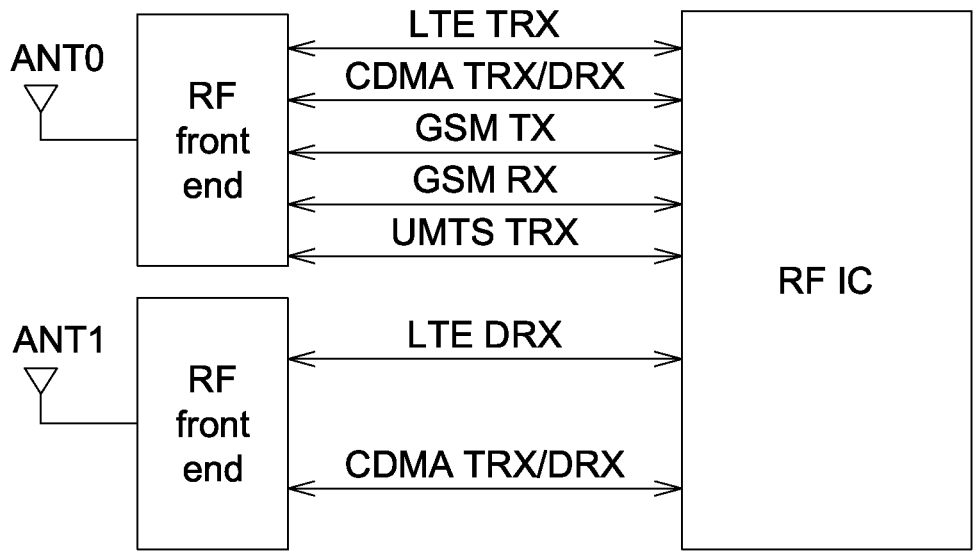
FIG. 1 illustrates a basic configuration of a radio frequency circuit in block diagram form.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
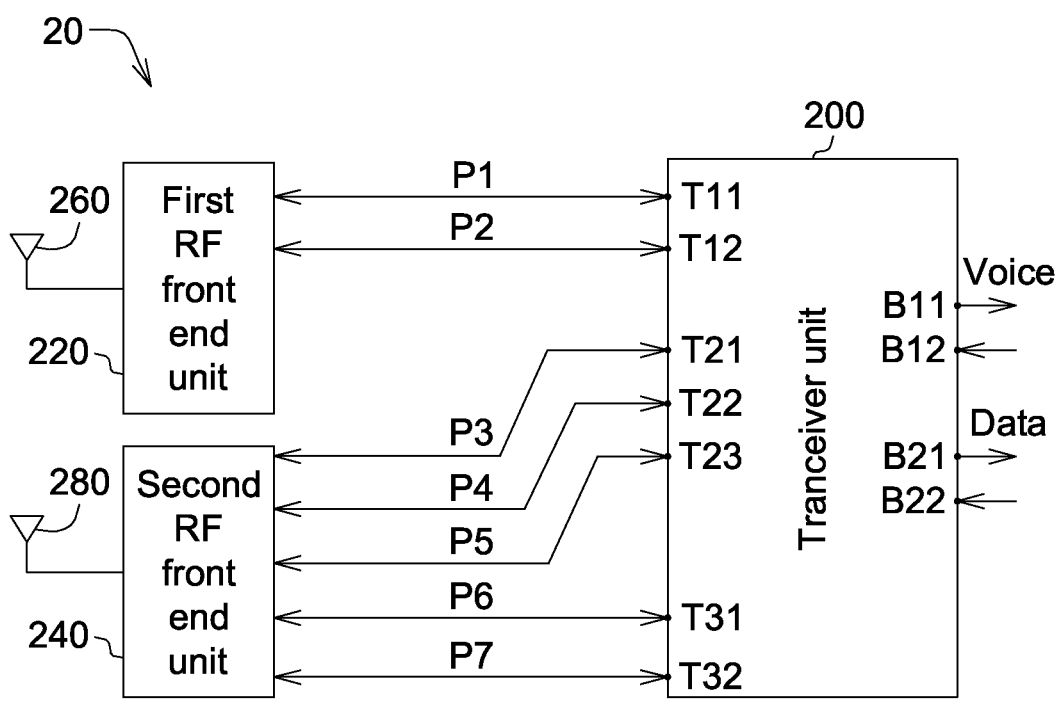
FIG. 2 is a block diagram of a mobile apparatus according to an embodiment, wherein the mobile apparatus includes a radio frequency circuit architecture supporting simultaneous data and voice communications.

Please refer to FIG. 2, which illustrates a schematic diagram of a radio frequency (RF) circuit 20 for a mobile device according to an embodiment. The radio frequency circuit 20 is preferably used in a mobile device in a wireless communication system. The wireless communication system 10 can be a simultaneous voice and LTE system, or other mobile communication system, which can briefly include a network and a plurality of mobile devices. The RF circuit 20 includes a tranceiver unit (i.e., a communication unit) 200, a first RF front end unit 220, a second RF front end unit 240, a first antenna 260, a second antenna 280, and a plurality of paths P1, P2-P7. The tranceiver unit 200 can be implemented by RF ICs (RF integrated circuits) for wireless communication systems such as communication systems based on LTE (Long Term Evolution) system, CDMA (Code Division Multiple Access) system, UMTS (universal mobile telecommunications system) system and GSM (Global System for Mobile Communications) system. The RF frond end units 220 and 240 may include suitable RF components, such as power amplifiers, switches, duplexers and diplexers. The antenna 260 is used for receiving and transmitting signals for LTE system and CDMA system. The antenna 260 is preferably a secondary antenna which has less clearance. The antenna 280 is used for receiving and transmitting signals from GSM system, UMTS system, LTE system and CDMA system.

For example, the paths P1 and P2 connect the RF front end unit 220 to the tranceiver unit 200. The path(s) P1 is for transmission and receiving (TRX) paths of a high-speed data communication mode, e.g., based on LTE. The path(s) P2 is for data transmission and receiving (TRX) path(s) of a first mobile communication mode, e.g., based on a CDMA system; or for data transmission and receiving (TRX) path and voice diversity receiving (DRX) path of the first mobile communication mode. The paths P3, P4, P5, P6, and P7 connect the RF front end unit 240 and the communication unit 200, wherein the paths such as P3, P4, and P5 provide transmission and receiving paths for at least a second mobile communication mode, such as a communication system for 2G or 3G. As an example, the path P3 is for a transmission path for GSM (GSM TX); the path P4 is for a receiving path for GSM (GSM RX); the path P5 is for transmission and receiving paths for UMTS (UMTS TRX). The path P6 is for a diversity receiving path for the high-speed data communication mode, e.g., based-on LTE; and the path P7 is for voice transmission and receiving path and data diversity receiving path of the first mobile communication mode.

Referring to FIG. 1, which illustrates a basic configuration of a radio frequency circuit of a mobile apparatus for supporting simultaneous voice and LTE data transmission (i.e. LTE (SVLTE)). In FIG. 1, the antenna ANT0 is a secondary antenna and the antenna ANT1 is a primary antenna. As shown in FIG. 1, all of the data TRX path for LTE and data TRX path for CDMA (or further including a voice DRX path for CDMA) are connected to the secondary antenna while all of the data DRX path for LTE and data DRX path for CDMA and voice TRX path for CDMA are connected to the primary antenna.

In order to have wide range use of voice call such as roaming system of worldwide area, support for more frequency bands on the mobile device will be necessary. If the secondary antenna ANT0 of the configuration illustrated in FIG. 1 is employed to support more frequency bands, the RF front end paths for GSM and UMTS bands (such as GSM TX, GSM RX, and UMTS TX/RX) are all connected to the secondary antenna (i.e., ANT0), for example. In this way, the requirements for antenna performance and clearance area inevitably become rigorous. However, it will make an impact on the overall antenna performance due to less clearance for the secondary antenna. As compared to FIG. 1, the RF front end paths (such as paths P3, P4, P5) of the communication modes, such as GSM and UMTS, other than the high-speed data communication mode and the first mobile communication mode of FIG. 2 are connected to the primary antenna (i.e., antenna 280). Since antenna 280 has a better clearance, the connection of FIG. 2 can lead to better antenna performance.

In one embodiment according to FIG. 2, the tranceiver unit 200 has: a plurality of first baseband terminals, such as B11-B12 for transmission and receiving a first baseband signal, such as 2G or 3G (e.g., GSM, CDMA, or UMTS) voice or data signals; and a plurality of second baseband terminals, such as B21-B22 for transmission and receiving a second baseband signal, such as LTE data signals. The baseband terminals can be coupled to other communication components (such as a baseband processor) of the mobile device. The tranceiver unit 200 further has: a plurality of first radio frequency terminals, such as T11-T12; a plurality of second radio frequency terminals, such as T21, T22, T23; and a plurality of third radio frequency terminals, such as T31-T32. The first RF frond-end unit 220 is coupled between the first antenna 260 and the first radio frequency terminals (such as T11-T12) so as to provide a plurality of first paths (such as the paths P1 and P2) for a high-speed data communication mode and a first mobile communication mode between the first radio frequency terminals and the first RF front-end unit 220. The second RF front-end unit 240 is coupled between the second antenna 280 and the second (such as T21-T23) and third (such as T31-T32) radio frequency terminals so as to provide a plurality of second paths (such as the paths P3, P4, P5) for at least one second mobile communication mode (such as mobile communication mode(s) for 2G or 3G) between the second radio frequency terminals and the second RF front-end unit 240 and to provide a plurality of third paths (such as the paths P6 and P7) for the high-speed data communication mode and the first mobile communication mode between the third radio frequency terminals (such as T31-T32) and the second RF front-end unit 240.

Figure 3:
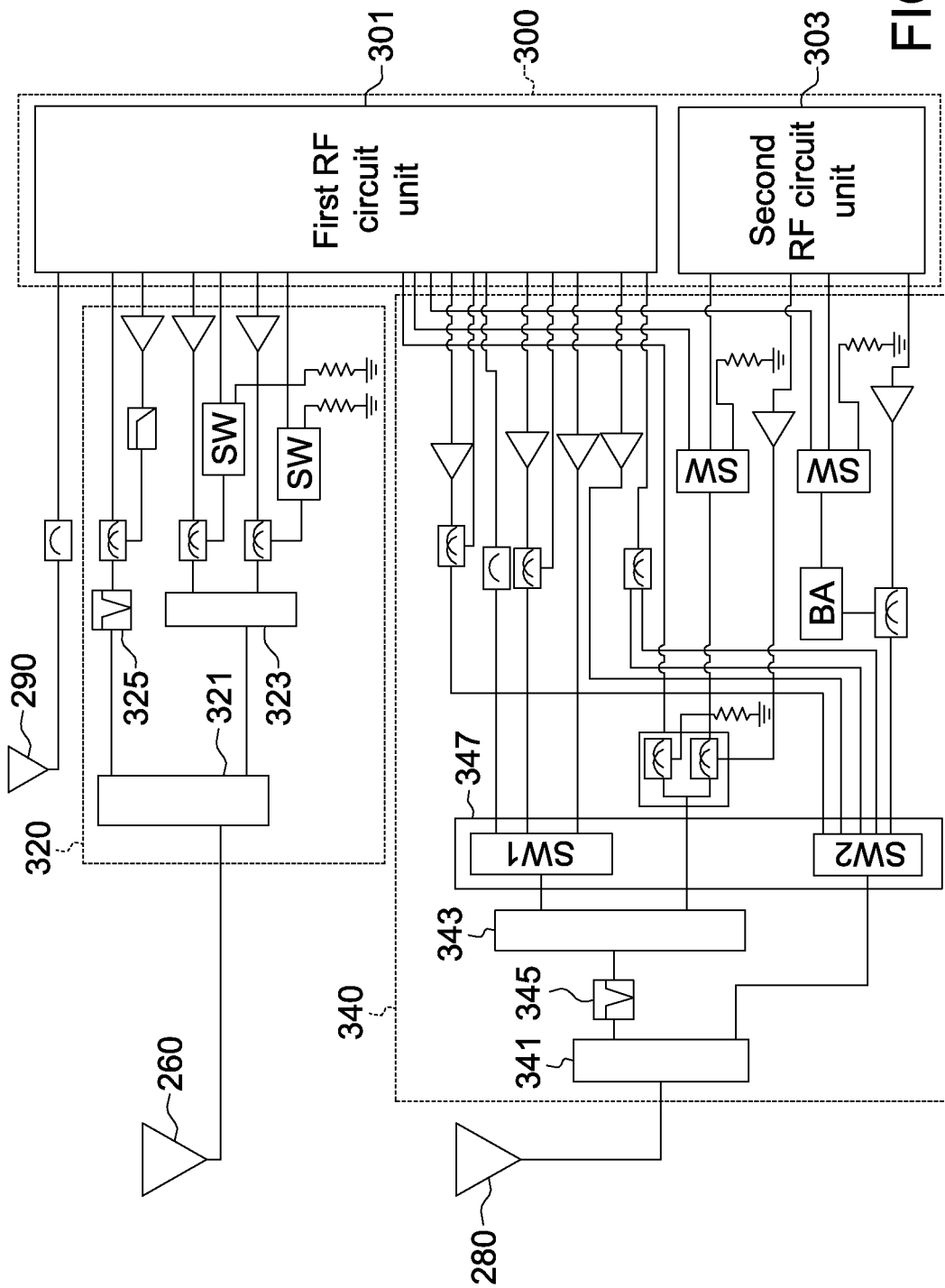
FIG. 3 shows a block diagram illustrating another embodiment of a mobile apparatus.

In another embodiment, the tranceiver unit 200 includes, for example, the two circuit units as illustrated in FIG. 3: a first radio frequency circuit unit, having the first and second radio frequency terminals (such as T11-T12 and T21-T23); and a second radio frequency circuit unit, having the third radio frequency terminals (such as T31-T3). The high-speed data communication mode is a data communication mode compliant to or based on the LTE technology. The first communication mode is such as a mobile communication mode based on CDMA, e.g., CDMAOne, CDMA2000, CDMA2000 1xEV-DO. In other embodiments, the first mobile communication mode is exemplified by a communication mode based on the third generation mobile communications. In addition, the at least one second mobile communication mode is a mobile communication mode supporting roaming.

Figure 4:
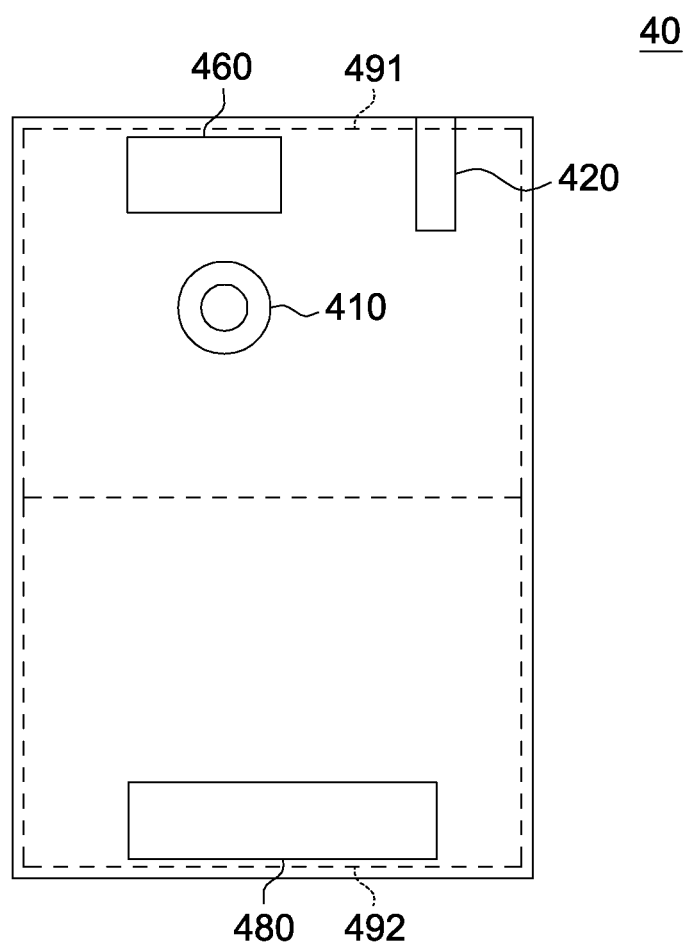
FIG. 4 illustrates a back view of a mobile apparatus.

Referring to FIGS. 2 and 4, in another embodiment, a communication device, such as a mobile device, e.g., a mobile phone, a smart mobile phone, an electronic book, a tablet computer or other wireless communication device, can be realized based on the RF circuit 20. Referring to FIG. 4, a back of a mobile apparatus 40 such as a mobile phone is illustrated for example. The mobile apparatus 40 includes a plurality of antennas, such as a first antenna 460 and a second antenna 480. The first antenna 460 is disposed between a first portion 491 of the mobile apparatus 40, such as an upper portion of the mobile apparatus 40. The second antenna 480 is disposed between a second portion 492 of the mobile apparatus 40, such as a lower portion of the mobile apparatus 40. In one embodiment, as shown in FIG. 4, the mobile apparatus 40 includes a camera module 410 and an audio jack 420, disposed in the upper portion, and the second portion 492 is a lower portion of the mobile apparatus 40 and a clearance area (such as an area around the second antenna 480) adjacent to the second antenna 480 is greater than a clearance area adjacent to the first antenna 460. A clearance area indicates an area where no conductor, such as metal or metal part; in other words, a clearance area is an area to which no metal is adjacent. In addition, the second antenna 480 is greater than the first antenna 460 in size, wherein the first antenna 460 is for transmission and receiving signals for such as pre-4G, 4G, and CDMA systems and the second antenna 480 is for transmission and receiving signals for such as 2G or 3G (e.g., GSM, UMTS, or technology based on CDMA such as CDMA2000 or the like), pre-4G, or 4G system. Pre-4G and 4 G communication systems are such as LTE or LTE-Advanced compliant to LTE.

Referring to FIG. 3, a radio frequency circuit of a mobile apparatus is illustrated according to another embodiment in a block diagram. In FIG. 3, a tranceiver unit 300 of a radio frequency circuit 30 is an embodiment of the tranceiver unit 200, including a first radio frequency (RF) circuit unit 301 and a second RF circuit unit 303. A first RF front end unit 320 and a second RF front end unit 340 are embodiments of the first RF front end unit 220 and the second RF front end unit 240, respectively. As illustrated in FIG. 3, the RF front end units, having appropriate RF components and circuit devices, such as, power amplifiers, switch devices (such as SW, SW1, SW2), duplexers, diplexers or filters. For example, the first RF front end unit 320 includes a switch device 321, a diplexer 323, a notch filter 325. For example, the second RF front end unit 340 includes a diplexer 341, a switch device 343, a notch filter 345, and a switch device 347. The switch device 321 or 343 is single-pole dual-throw (SP2T) switch device, for example. The switch device 347, for example, is a dual-pole nine-throw (DP9T) switch device including two switch devices SW1 and SW2, wherein the switch device SW1 is a single-pole four-throw (SP4T) switch device and the switch device SW2 is a single-pole five-throw (SP5T) switch device. In addition, the RF front end units may include other appropriate RF components, such as a balun BA.

In some embodiments, the RF circuit according to one shown in FIG. 2 or 3 indicates a mobile apparatus supporting simultaneous data communication based on LTE mode and voice communication based on CDMA mode. The mobile apparatus for example a mobile phone, a smart phone, an electronic book, a tablet computer or other wireless communication devices, wherein the communication device can also support other communication mode, for example, such as 2G and 3G systems, such as GSM and UMTS systems. In other embodiments, if pre-4G (such as LTE) or 4G system can support roaming, the RF circuit according to one shown in FIG. 2 or 3 can also support simultaneous 4G (such as LTE) and 2G (such as GSM) communications, and/or 4G (such as LTE) and 3G (such as UMTS) communications.

Further, the above embodiments can also include other antenna. As shown in FIG. 3, a third antenna 290 can also be included, such as an antenna for global positioning system (GPS).

In the above embodiments, a radio frequency circuit of a communication device is provided. In one embodiment, the RF front end paths (such as paths P3, P4, P5) for 2G and 3G frequency bands are connected to the primary antenna (such as antenna 280). This connection leads to improved antenna performance since the antenna 280 has a better clearance area. In another embodiment, if high-speed data communication mode (such as LTE of pre-4G) system can support roaming, the RF circuit according to the embodiment can also support simultaneous pre-4G and GSM communications and pre-4G and UMTS communications.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A mobile apparatus, comprising:
    a first antenna, disposed between a first portion of the mobile apparatus;
    a second antenna, disposed between a second portion of the mobile apparatus;
    a transceiver unit, having a plurality of first radio frequency terminals, a plurality of second radio frequency terminals, and a plurality of third radio frequency terminals;
    a first radio frequency front-end unit, coupled between the first antenna and the first radio frequency terminals so as to provide a plurality of first paths for a high-speed data communication mode and a first mobile communication mode between the first radio frequency terminals and the first radio frequency front-end unit; and
    a second radio frequency front-end unit, coupled between the second antenna and the second and third radio frequency terminals so as to provide a plurality of second paths for at least one second mobile communication mode between the second radio frequency terminals and the second radio frequency front-end unit and to provide a plurality of third paths for the high-speed data communication mode and the first mobile communication mode between the third radio frequency terminals and the second radio frequency front-end unit.

2. The mobile apparatus according to claim 1, wherein the first mobile communication mode is a communication mode based on third generation mobile communications.

3. The mobile apparatus according to claim 1, wherein the at least one second mobile communication mode is a mobile communication mode supporting roaming.

4. The mobile apparatus according to claim 1, wherein the tranceiver unit comprises:
    a first radio frequency circuit unit, having the first and second radio frequency terminals; and
    a second radio frequency circuit unit, having the third radio frequency terminals.

5. The mobile apparatus according to claim 1, wherein the first portion is an upper portion of the mobile apparatus.

6. The mobile apparatus according to claim 5, wherein the mobile apparatus includes a camera module, disposed in the upper portion.

7. The mobile apparatus according to claim 6, wherein the second portion is a lower portion of the mobile apparatus.

8. The mobile apparatus according to claim 1, wherein the second antenna is larger than the first antenna in size.

9. The mobile apparatus according to claim 1, wherein the second portion is a lower portion of the mobile apparatus and a clearance area adjacent to the second antenna is greater than a clearance area adjacent to the first antenna.

10. The mobile apparatus according to claim 1, wherein the high-speed data communication mode is a mode compliant with Long Term Evolution technology.

11. The mobile apparatus according to claim 10, wherein the first mobile communication mode is a mobile communication mode based on Code Division Multiple Access.

12. The mobile apparatus according to claim 1, wherein the first paths include: transmission and receiving paths for the high-speed data communication mode; and data transmission and receiving paths for the first mobile communication mode.

13. The mobile apparatus according to claim 12, wherein the third paths include: diversity receiving paths for the high-speed data communication mode; and voice transmission and receiving paths for the first mobile communication mode.

14. The mobile apparatus according to claim 13, wherein the first paths further include: voice diversity receiving paths for the first mobile communication mode.

15. The mobile apparatus according to claim 13, wherein the second paths include: transmission and receiving paths for each of the at least one second mobile communication mode.

16. The mobile apparatus according to claim 15, wherein the at least one second mobile communication mode includes: a first mode based on a communication mode of second generation mobile communications, and a second mode based on a communication mode of third generation mobile communications; and the second paths include: transmission and receiving paths for the first mode and transmission and receiving paths for the second mode.

17. The mobile apparatus according to claim 15, wherein the second portion is a lower portion of the mobile apparatus and a clearance area adjacent to the second antenna is greater than a clearance area adjacent to the first antenna.

* * * * *